United States Patent
Thomas et al.

(10) Patent No.: US 7,480,683 B2
(45) Date of Patent: Jan. 20, 2009

(54) SYSTEM AND METHOD FOR HEURISTIC ANALYSIS TO IDENTIFY PESTWARE

(75) Inventors: Steve Thomas, Boulder, CO (US); Michael P. Greene, Boulder, CO (US); Bradley D. Stowers, Mead, CO (US)

(73) Assignee: Webroot Software, Inc., Boulder, CO (US)

( * ) Notice: Subject to any disclaimer, the term of this patent is extended or adjusted under 35 U.S.C. 154(b) by 442 days.

(21) Appl. No.: 10/956,573

(22) Filed: Oct. 1, 2004

(65) Prior Publication Data

US 2006/0075501 A1    Apr. 6, 2006

(51) Int. Cl.
G06F 17/30 (2006.01)

(52) U.S. Cl. .............................. 707/205; 707/6; 726/24

(58) Field of Classification Search .................. 726/24, 726/22; 713/200, 201, 182; 707/6, 205
See application file for complete search history.

(56) References Cited

U.S. PATENT DOCUMENTS

| | | | | |
|---|---|---|---|---|
| 5,442,669 | A * | 8/1995 | Medin | 377/20 |
| 5,485,575 | A * | 1/1996 | Chess et al. | 714/38 |
| 5,623,600 | A | 4/1997 | Ji et al. | |
| 5,696,822 | A * | 12/1997 | Nachenberg | 726/24 |
| 5,826,013 | A * | 10/1998 | Nachenberg | 726/22 |
| 5,951,698 | A * | 9/1999 | Chen et al. | 714/38 |
| 5,987,611 | A * | 11/1999 | Freund | 726/4 |
| 6,069,628 | A | 5/2000 | Farry et al. | |
| 6,073,241 | A | 6/2000 | Rosenberg et al. | |
| 6,092,194 | A | 7/2000 | Touboul | |
| 6,154,844 | A | 11/2000 | Touboul | |
| 6,167,520 | A | 12/2000 | Touboul | |
| 6,192,512 | B1 * | 2/2001 | Chess | 717/127 |
| 6,253,258 | B1 * | 6/2001 | Cohen | 719/331 |
| 6,310,630 | B1 | 10/2001 | Kulkarni et al. | |
| 6,357,008 | B1 * | 3/2002 | Nachenberg | 726/24 |
| 6,397,264 | B1 | 5/2002 | Stasnick et al. | |
| 6,405,316 | B1 * | 6/2002 | Krishnan et al. | 713/190 |
| 6,457,174 | B1 * | 9/2002 | Kuroda et al. | 717/162 |
| 6,460,060 | B1 | 10/2002 | Maddalozzo, Jr. et al. | |
| 6,473,406 | B1 * | 10/2002 | Coile et al. | 709/225 |

(Continued)

FOREIGN PATENT DOCUMENTS

WO   PCT/US2007/067076   11/2007

(Continued)

OTHER PUBLICATIONS

PCT Search Report, PCT/US05/34874, Jul. 5, 2006, 7 Pages.

(Continued)

*Primary Examiner*—Shahid A Alam
(74) *Attorney, Agent, or Firm*—Cooley Godward Kronish LLP

(57) ABSTRACT

Systems for preventing pestware activity are described. One embodiment a heuristic engine configured to identify repeat pestware activity and configured to block the repeat pestware activity; an operating system pestware shield in communication with the heuristic engine, the operating system pestware shield configured to detect pestware activity and report the pestware activity to the heuristic engine; and a browser pestware shield in communication with the heuristic engine, the browser pestware shield configured to detect pestware activity and report the pestware activity to the heuristic engine.

7 Claims, 7 Drawing Sheets

U.S. PATENT DOCUMENTS

| | | | |
|---|---|---|---|
| 6,480,962 | B1 | 11/2002 | Touboul |
| 6,535,931 | B1 | 3/2003 | Celi, Jr. |
| 6,611,878 | B2 | 8/2003 | De Armas et al. |
| 6,633,835 | B1 | 10/2003 | Moran et al. |
| 6,667,751 | B1 | 12/2003 | Wynn et al. |
| 6,681,972 | B1 * | 1/2004 | Tapocik ............... 224/602 |
| 6,701,441 | B1 | 3/2004 | Balasubramaniam et al. |
| 6,735,703 | B1 * | 5/2004 | Kilpatrick et al. ......... 726/23 |
| 6,772,345 | B1 * | 8/2004 | Shetty .................. 726/24 |
| 6,775,780 | B1 * | 8/2004 | Muttik .................. 726/24 |
| 6,785,732 | B1 | 8/2004 | Bates et al. |
| 6,804,780 | B1 | 10/2004 | Touboul |
| 6,813,711 | B1 | 11/2004 | Dimenstein |
| 6,829,654 | B1 | 12/2004 | Jungek |
| 6,851,057 | B1 * | 2/2005 | Nachenberg ............ 726/24 |
| 6,910,134 | B1 * | 6/2005 | Maher et al. ............ 726/24 |
| 6,965,968 | B1 | 11/2005 | Touboul |
| 7,058,822 | B2 | 6/2006 | Edery et al. |
| 7,107,617 | B2 * | 9/2006 | Hursey et al. ............ 726/22 |
| 7,210,168 | B2 * | 4/2007 | Hursey et al. ............ 726/24 |
| 2002/0166063 | A1 * | 11/2002 | Lachman et al. ......... 713/200 |
| 2003/0065943 | A1 * | 4/2003 | Geis et al. ............... 709/224 |
| 2003/0074581 | A1 * | 4/2003 | Hursey et al. ........... 713/201 |
| 2003/0101381 | A1 * | 5/2003 | Mateev et al. ............ 714/38 |
| 2003/0159070 | A1 * | 8/2003 | Mayer et al. ............ 713/201 |
| 2003/0217287 | A1 | 11/2003 | Kruglenko |
| 2004/0030914 | A1 | 2/2004 | Kelley et al. |
| 2004/0034794 | A1 * | 2/2004 | Mayer et al. ............ 713/200 |
| 2004/0064736 | A1 | 4/2004 | Obrecht et al. |
| 2004/0080529 | A1 | 4/2004 | Wojcik |
| 2004/0143763 | A1 | 7/2004 | Radatti |
| 2004/0187023 | A1 | 9/2004 | Alagna et al. |
| 2004/0225877 | A1 | 11/2004 | Huang |
| 2005/0138433 | A1 | 6/2005 | Linetsky |
| 2005/0268112 | A1 | 12/2005 | Wang |
| 2006/0074896 | A1 | 4/2006 | Thomas |
| 2006/0085528 | A1 | 4/2006 | Thomas |
| 2006/0272021 | A1 | 11/2006 | Marinescu |

FOREIGN PATENT DOCUMENTS

WO PCT/US2007/067084    11/2007

OTHER PUBLICATIONS

U.S. Appl. No. 10/956,578, filed Oct. 1, 2004, Steve Thomas.
U.S. Appl. No. 10/956,574, filed Oct. 1, 2004, Steve Thomas.
U.S. Appl. No. 11/237,291, filed Sep. 28, 2005, Philip Maddaloni.
U.S. Appl. No. 11/258,536, filed Oct. 25, 2005, Sarah Moode et al.
Codeguru, Three Ways to Inject Your Code Into Another Process, by Robert Kuster, Aug. 4, 2003, 19 pgs.
Codeguru, Managing Low-Level Keyboard Hooks With The Windows API for VB .Net, by Paul Kimmel, Apr. 18, 2004, 8 pgs.
Codeguru, Hooking The Keyboard, by Anoop Thomas, Dec. 13, 2001, 6 pgs.
Illusive Security, Wolves In Sheep's Clothing: malicious DLLs Injected Into trusted Host Applications, Author Unknown, http://home.arcor.de/scheinsicherheit/dll.htm 13 pgs.
DevX.com, Intercepting Systems API Calls, by Seung-Woo Kim, May 13, 2004, 4 pgs.
Microsoft.com, How To Subclass A Window in Windows 95, Article ID 125680, Jul. 13, 2004, 2 pgs.
MSDN, by Kyle Marsh, Jul. 29, 1993, 14 pgs.

* cited by examiner

SYSTEM AND METHOD FOR HEURISTIC ANALYSIS TO IDENTIFY PESTWARE

RELATED APPLICATIONS

The present application is related to commonly owned and assigned application Ser. No. 10/956,578 entitled System and Method For Monitoring Network Communications For Pestware, which is incorporated herein by reference.

The present application is related to commonly owned and assigned application Ser. No. 10/956,574 entitled System and Method for Pestware Detection and Removal, which is incorporated herein by reference.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to computer system management. In particular, but not by way of limitation, the present invention relates to systems and methods for controlling pestware or malware.

BACKGROUND OF THE INVENTION

Personal computers and business computers are continually attacked by trojans, spyware, and adware, collectively referred to as "malware" or "pestware." These types of programs generally act to gather information about a person or organization—often without the person or organization's knowledge. Some pestware is highly malicious. Other pestware is non-malicious but may cause issues with privacy or system performance. And yet other pestware is actual beneficial or wanted by the user. Wanted pestware is sometimes not characterized as "pestware" or "spyware." But, unless specified otherwise, "pestware" as used herein refers to any program that collects information about a person or an organization.

Software is available to detect and remove pestware. But as pestware evolves, the software to detect and remove it must also evolve. Accordingly, current techniques and software are not always currently satisfactory and will most certainly not be satisfactory in the future. Additionally, because some pestware is actually valuable to a user, pestware-detection software should, in some cases, be able to handle differences between wanted and unwanted pestware.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

One embodiment of the present invention includes a heuristic engine configured to identify repeat pestware activity and configured to block the repeat pestware activity; an operating system pestware shield in communication with the heuristic engine, the operating system pestware shield configured to detect pestware activity and report the pestware activity to the heuristic engine; and a browser pestware shield in communication with the heuristic engine, the browser pestware shield configured to detect pestware activity and report the pestware activity to the heuristic engine.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
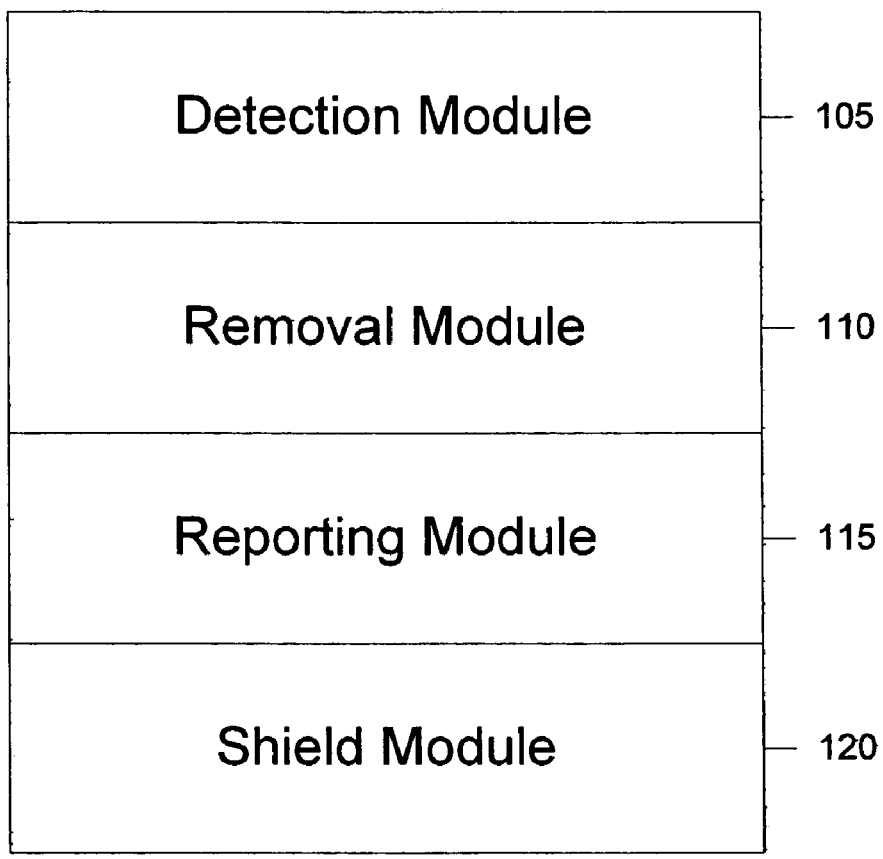
FIG. 1 illustrates a block diagram of one implementation of the present invention.

Referring now to the drawings, where like or similar elements are designated with identical reference numerals throughout the several views, and referring in particular to FIG. 1, it illustrates a block diagram 100 of one implementation of the present invention. This implementation includes four components: a detection module 105, a removal module 110, a reporting module 115, and a shield module 120. Each of these modules can be implemented in software or hardware. And if implemented in software, the modules can be designed to operate on any type of computer system including WINDOWS and Linux-based systems Additionally, the software can be configured to operate on personal computers and/or servers. For convenience, embodiments of the present invention are generally described herein with relation to WINDOWS-based systems. Those of skill in the art can easily adapt these implementations for other types of operating systems or computer systems.

Referring first to the detection module 105, it is responsible for detecting pestware or pestware activity on a protected computer or system. (The term "protected computer" is used to refer to any type of computer system, including personal computers, handheld computers, servers, firewalls, etc.) Typically, the detection module 105 uses pestware definitions to scan the files that are stored on a computer system or that are running on a computer system. The detection module 105 can also check WINDOWS registry files and similar locations for suspicious entries or activities. Further, the detection module 105 can check the hard drive for third-party cookies.

Note that the terms "registry" and "registry file" relate to any file for keeping such information as what hardware is attached, what system options have been selected, how computer memory is set up, and what application programs are to be present when the operating system is started. As used herein, these terms are not limited to WINDOWS and can be used on any operating system.

Pestware and pestware activity can also be identified by the shield module 120, which generally runs in the background on the computer system. Shields, which will be discussed in more detail below, can generally be divided into two categories: those that use definitions to identify known pestware and those that look for behavior common to pestware. This combination of shield types acts to prevent known pestware and unknown pestware from running or being installed on a protected computer.

Once the detection or shield module (105 and 120) detects software that could be pestware, the pestware files can be removed or at least quarantined to prevent further issues. The removal module 110, in one implementation, quarantines a potential pestware file and offers to remove it. In other embodiments, the removal module 110 can instruct the protected computer to remove the pestware upon rebooting. And in yet other embodiments, the removal module 110 can inject code into pestware that prevents the pestware from restarting or being restarted.

In many cases, the detection and shield modules (105 and 120) detect pestware by matching files on the protected computer with definitions of pestware, which are collected from a variety of sources. For example, host computers (shown in FIG. 7), protected computers and other systems can crawl the Web to actively identify pestware. These systems often download programs and search for exploits. The operation of these exploits can then be monitored and used to create pestware definitions.

Alternatively, users can report pestware to a host computer using the reporting module 115. And in some implementations, users may report potential pestware activity to the host computer. The host computer can then analyze these reports, request more information from the target computer if necessary, and then form the pestware definition. This definition can then be pushed from the host computer through a network to one or all of the protected computers and/or stored centrally. Alternatively, the protected computer can request that the definition be sent from the host computer for local storage.

Figure 2:
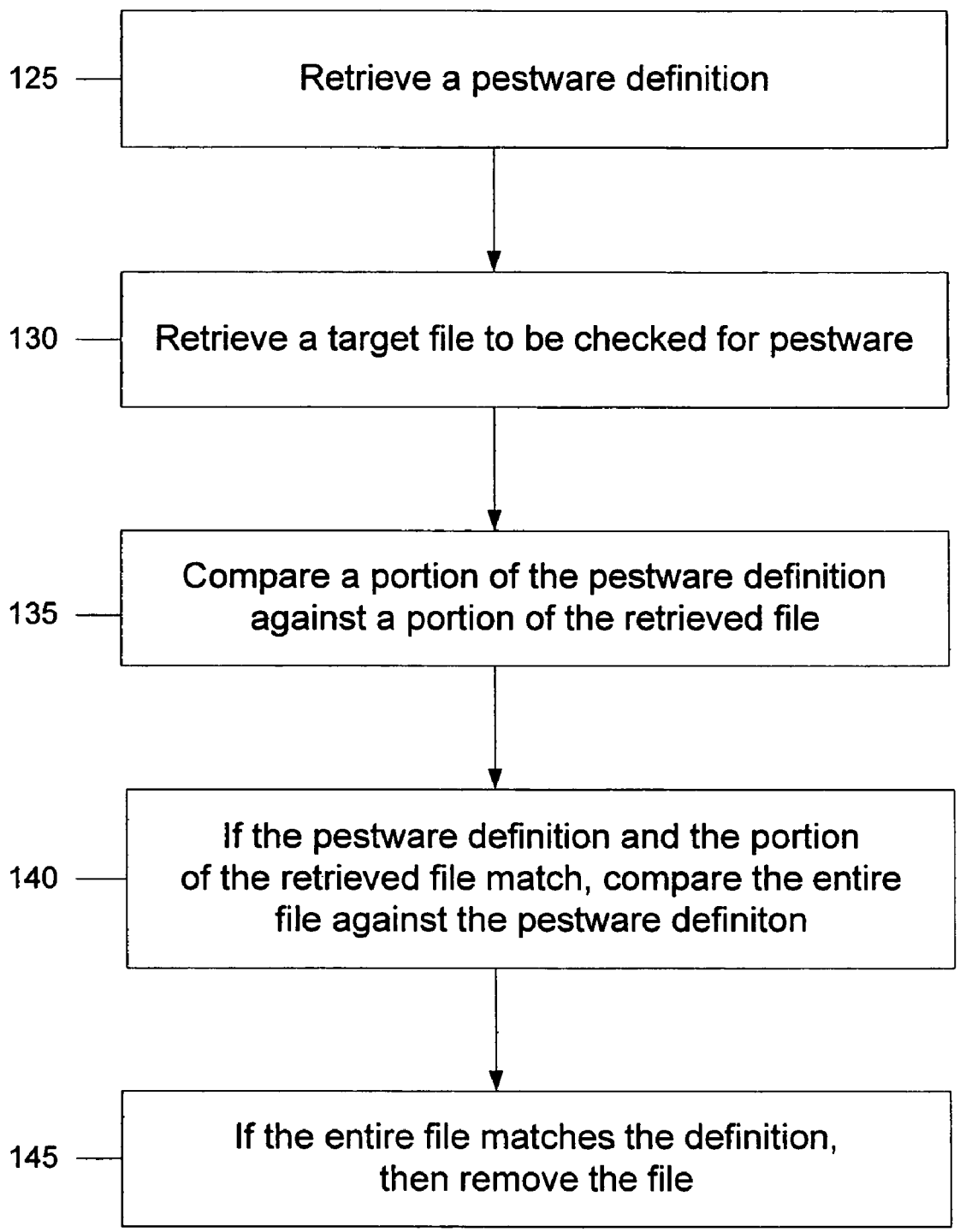
FIG. 2 is a flowchart of one method for managing pestware.

Referring now to FIG. 2, it is a flowchart of one method for managing pestware. In this method, the protected computer initially retrieves a pestware definition. The definition could include a representation of a pestware file or it could include suspicious activity for which the protected computer should monitor. (Block 125) This definition can be retrieved from local storage to the protected computer or from storage remote to the protected computer. The protected computer can then identify and retrieve a target file or an executing program (collectively referred to as a "file" for this figure) that should be checked for pestware. (Block 130) This target file can then be compared against the pestware definition. Target files can be any file on a computer system or only particular files based on file type, such as executable files.

In one implementation, the target file is scanned to determine if it includes an exact or substantial copy of the pestware. Because scanning all files in a computer system in their entirety would take a significant amount of time, one implementation of the comparison function enables staged comparisons. In the first stage, the protected computer scans its files and running programs for a small portion of a known pestware file. And in some embodiments, the protected computer could use hash functions to speed up any comparison. For example, the definition of a particular known pestware file could include a cyclic redundancy code (CRC) of the first 500 bytes of the file. The protected computer could then calculate a CRC for target files on the protected computer. The target file is any file that is being scanned for pestware. Note that the number of bytes used to calculate the CRCs is not relevant as long as the number of bytes is large enough to provide some degree of accuracy when comparing the target file to a pestware definition.

After both CRCs have been determined, they can be compared. (Block 135) And if they match, then the second stage of verification determines whether the target file is actually pestware. This second stage involves a complete or substantially complete comparison between the pestware definition and the target file. Generating a hash for both the definition and the file provides one method for comparing them. One example of a hashing algorithm that could be used to compare the definition and the target file is MD5. MD5 produces a digital signature for a file that is as unique as a fingerprint is to a person. Thus, if the result of the MD5 hash is the same for both the target file and the pestware definition, then the two files are virtually guaranteed to be equivalent—meaning that the target file is very likely pestware. (Block 140) And once a file has been identified as pestware, it can be removed. (Block 145)

Figure 3:
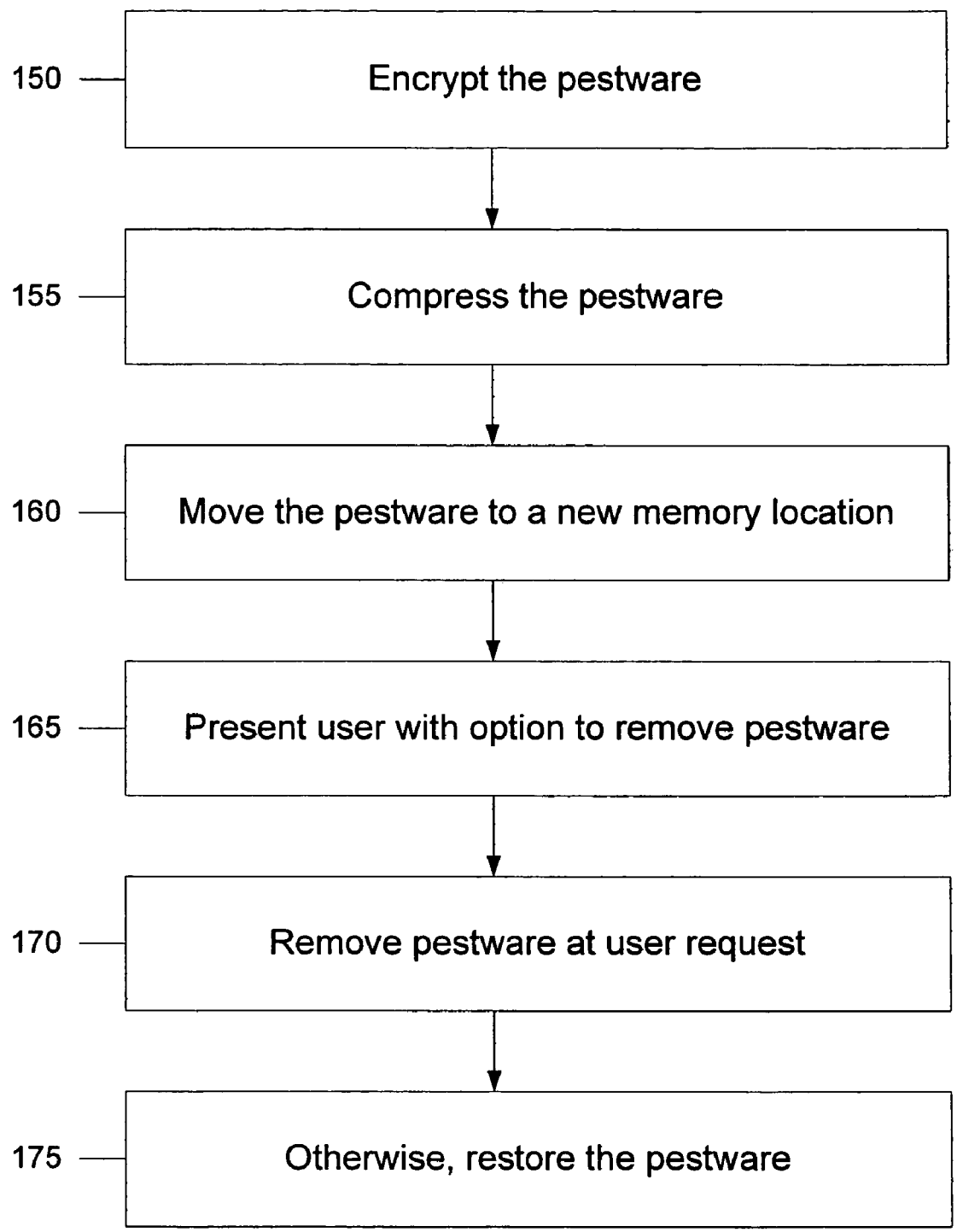
FIG. 3 is a flowchart of one method for handling files after they have been identified as pestware.

Referring now to FIG. 3, it illustrates one method of handling files after they have been identified as pestware. In this method, the file is first quarantined. Quarantining usually involves acting on the file to prevent it from executing. In one embodiment, the identified file is compressed, encrypted, and relocated. In other embodiments, it is renamed and relocated. (Blocks 150, 155, and 160) In either embodiment, however, the original location of the file and/or its original state is stored.

Notably, not all pestware is unwanted or undesirable, and automatic removal is not always an acceptable option for users of these programs. For example, popular file-sharing programs like KAZAA act as wanted spyware. Similarly, the popular GOOGLE toolbar acts as wanted spyware in certain instances. Because users typically want to retain these types of programs, embodiments of the present invention enable the user to selectively identify and retain pestware files. (Block 165) And in certain embodiments, the protected computer can retain a list of approved pestware so that in future sweeps, the computer does not quarantine any pestware included in the list.

Finally, if the user elects to remove the pestware, it is deleted from the system. (Block 170) But if the user selects to retain the pestware, it is returned to its original form and location. The file can also be flagged as an approved program and added to an approved list. (Block 175)

Figure 4:
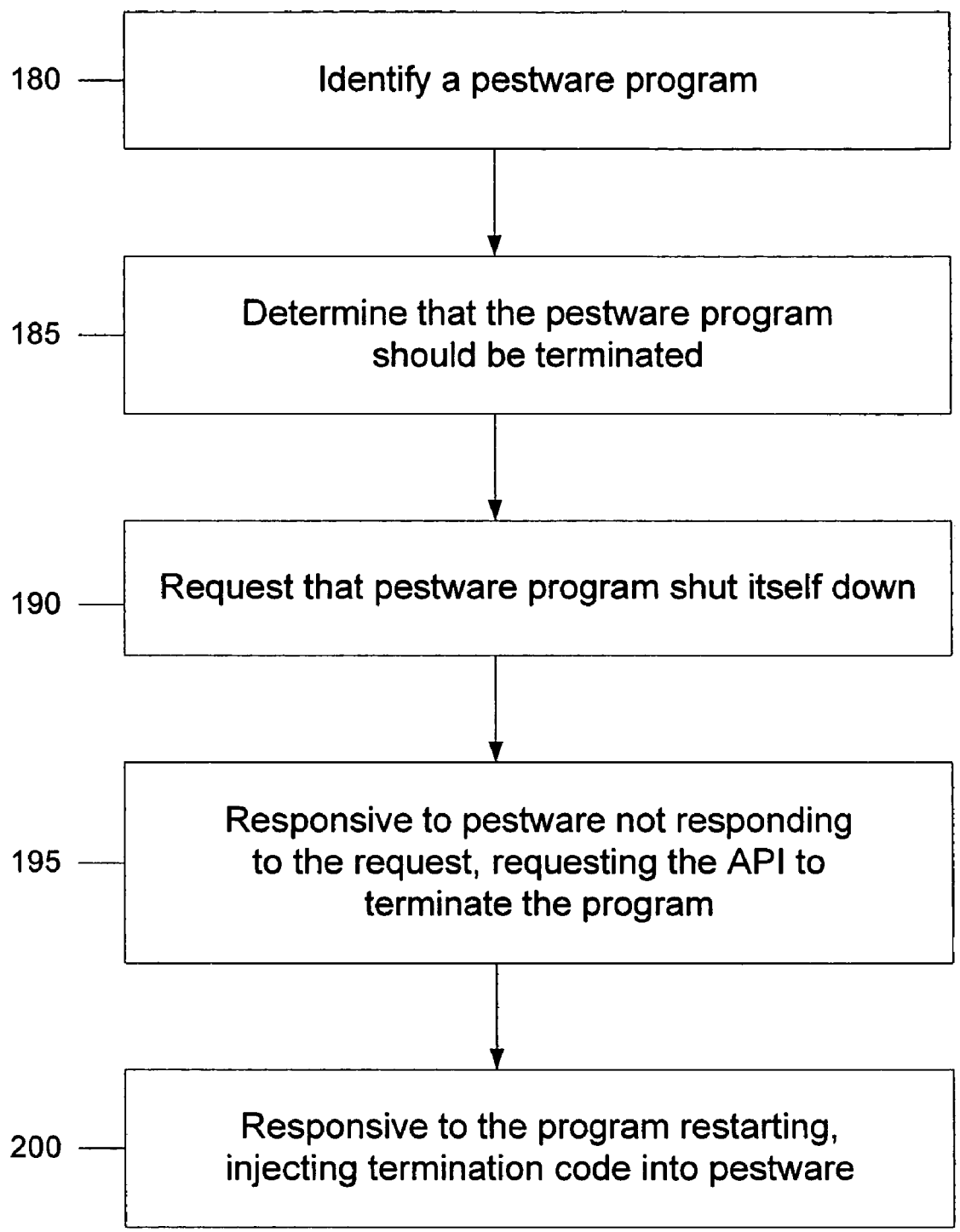
FIG. 4 illustrates another method for handling files after they are identified as pestware.

Referring now to FIG. 4, it shows a method of terminating pestware while the pestware is running. In this implementation, an executing program is identified as pestware that should be terminated. (Blocks 180 and 185) But in certain instances, it is not safe or not possible to terminate the pestware while it is running. The pestware, instead, should be removed upon reboot—before it ever has a chance to execute.

When these types of pestware programs are identified, instructions can be inserted into the WINDOWS registry file, for example, the "run once" folder, to remove the associated files upon reboot—before the pestware program is started. The removal instruction should be inserted high on the "run once" list in case the pestware is monitoring for removal commands or has its own commands inserted into the registry file. Additionally, the removal instruction should be monitored and protected to prevent the pestware from removing it completely from the registry file.

Assuming that the pestware program can be safely shut down while it is running, the user is given the option of terminating the program. And if the user elects to terminate the program, the pestware is requested to shut itself down, through, for example a WM_CLOSE message. (Block 190) This request is typically issued through a WINDOWS call. If the pestware program does not terminate itself, then the WINDOWS application program interface (API) is requested to terminate the program. (Block 195) Broadly, if the program will not shut itself down, then the operating system is requested to shut the program down.

Typically, the operating system can terminate most pestware. But a problem arises when the pestware is associated with a sympathetic program that can restart it. For example, a watcher program can monitor a pestware program, and when the watcher program detects that the pestware program has been terminated, the watcher program could restart it, possibly under a new name. Similarly, when the watcher program is terminated, the pestware program could restart it. These types of mutually-sympathetic programs are difficult for traditional pestware-removal programs to handle. But one implementation of the present invention can address these types of programs by injecting code directly into the pestware programs. (Block 200)

Figure 5:
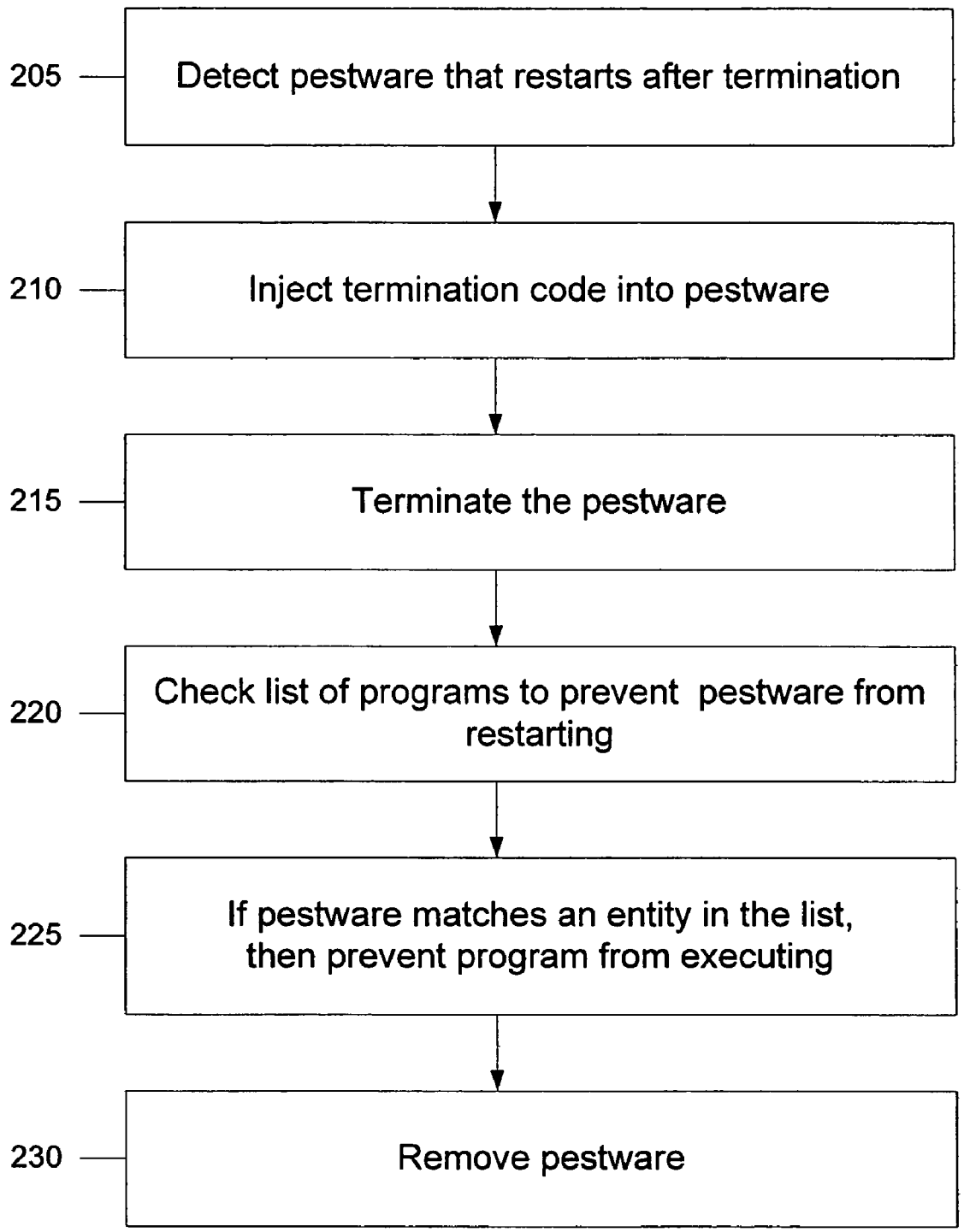
FIG. 5 illustrates one method of removing pestware from memory through code injection.

Referring now to FIG. 5, it shows one method of injecting code into pestware. In this implementation, the protected computer attempts to identify the resistant or restarting pestware. And if the pestware itself cannot be identified, then the protected computer should recognize some pestware is restarting itself or is otherwise resistant to removal. (Block 205) Generally, resistant pestware can be identified by storing information about each pestware program removed or quarantined. For example, the protected computer could store the pestware program name, a digital signature for the program, information about the pestware program's activities, or information from the shield module 120. This information, or at least parts of it, can be used to determine if the same pestware program is being removed continuously. And if the protected computer is not being infected continuously from an outside source, then an internal program is likely restarting the pestware program once it is removed. This internal program is called a watcher program.

If the watcher program can be identified, then it is quarantined along with the pestware program. But if the watcher program cannot be identified, then code injection can be used to block its activities.

During the code injection process, a termination code program is inserted into each running program or each stored pestware program. (Block 210) This code is often injected into the initialization portion of a file. Generally, this code is a "dll" file that instructs the program upon execution to compare itself to a list of pestware that is being targeted for removal. This list could include all known pestware or just pestware that is known or suspected to restart itself. Additionally, the list of targeted pestware could be stored in the injected code, on the protected computer, or at a remote location.

In operation, the injected code could instruct a program to check its file name against a list of file names for known pestware or against a list of file names for resistant pestware. Alternatively, the code could instruct the program to call another program to perform the comparison. And in yet another embodiment, the code could instruct the program to call a digital signature function (CRC, hash, etc.) and then compare the digital signature of the program against the signatures for known pestware.

After the code is injected, the corresponding programs can be terminated. (Block 215) As these programs attempt to restart, the injected code determines whether they should be allowed to completely restart. (Block 220) For example, if the injected code determines that the restarting program matches known pestware or is otherwise suspicious, the injected code can prevent the program from continuing its startup process. (Block 225) Alternatively, the injected code can terminate the program. But if the injected code determines that the restarting program is not pestware, the process is permitted to start. And in some cases, the injected code removes itself from non-pestware programs.

At this point, both sympathetic programs—the watcher and the primary pestware program—should be injected with the termination code. Neither program should be able to restart itself or the other program. Accordingly, both programs can be quarantined and deleted in the normal fashion. (Block 230)

Figure 6:
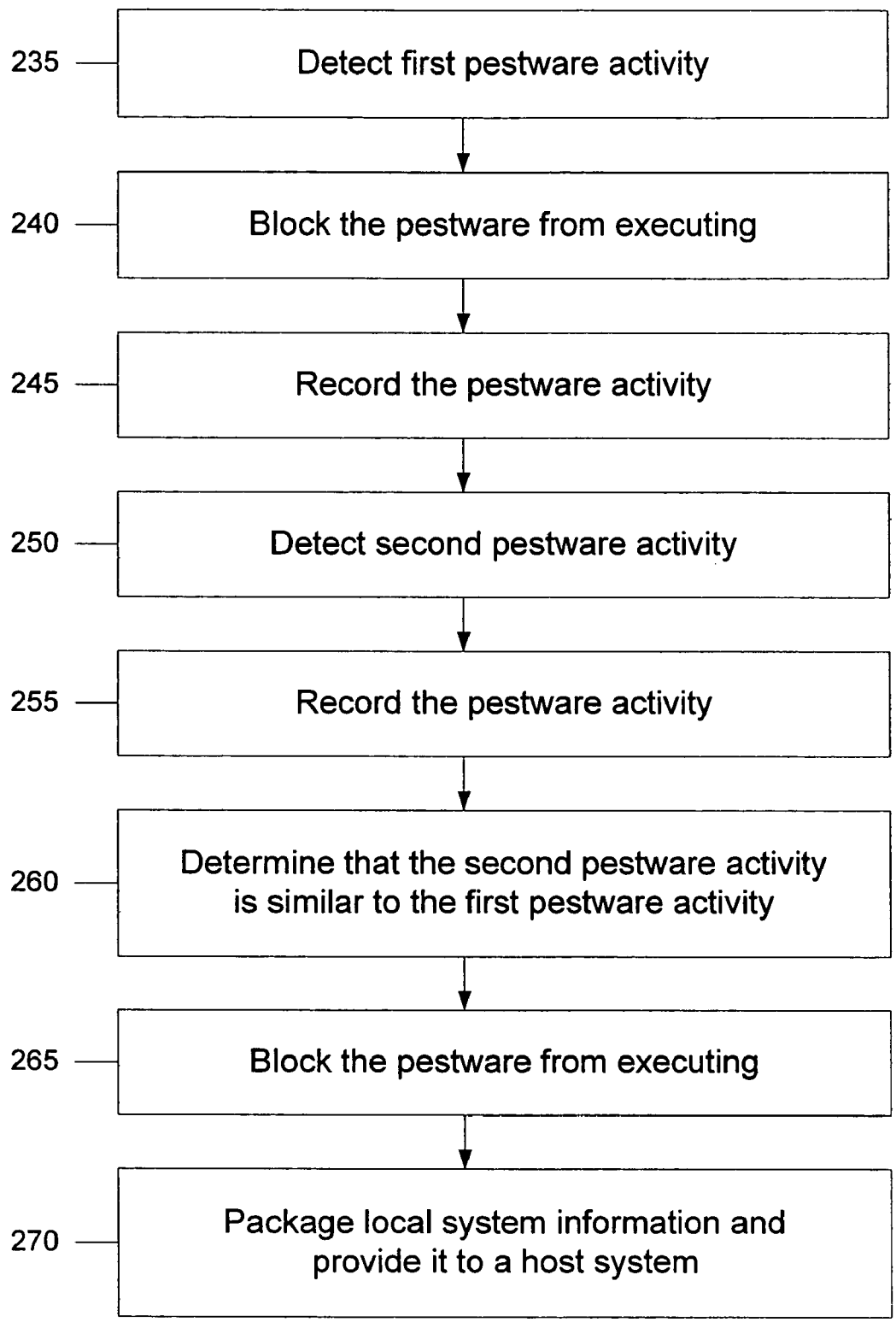
FIG. 6 illustrates another method for managing pestware that is resistant to permanent removal or that cannot be identified for removal.

Referring now to FIG. 6, it is another method for managing pestware that is resistant to permanent removal or that cannot be identified for removal. In this implementation, pestware activity is identified. (Block 235) The activity could be identified by the presence of a certain file or by activities on the computer such as changing registry entries. If a pestware program can be identified, then it should be removed. If the program cannot be identified, then the activity can be blocked. (Block 240) In essence, the symptoms of the pestware can be treated without identifying the cause. For example, if an unknown pestware program is attempting to change the protected computer's registry file, then that activity can be blocked. Both the pestware activity and the countermeasures can be recorded for subsequent diagnosis. (Block 245)

Next, the protected computer detects further pestware activity and determines whether it is new activity or similar to previous activity that was blocked. (Blocks 250, 255, and 260) For example, the protected computer can compare the pestware activity—the symptoms—corresponding to the new pestware activity with the pestware activity previously blocked. If the activities match, then the new pestware activity can be automatically blocked. (Block 265) And if the file associated with the activity can be identified, it can be automatically removed.

To assist in creating a definition for unknown pestware, the reporting module (shown in FIG. 1) can bundle information about the pestware and pass it back to a host, which can use that information to form a definition. (Block 270) For example, the records about the protected computer's registry file and any attempted changes can be passed to the host. If the host needs additional information, it may request that information from the reporting module. The user of the protected computer could determine how much information is reported to the host.

Figure 7:
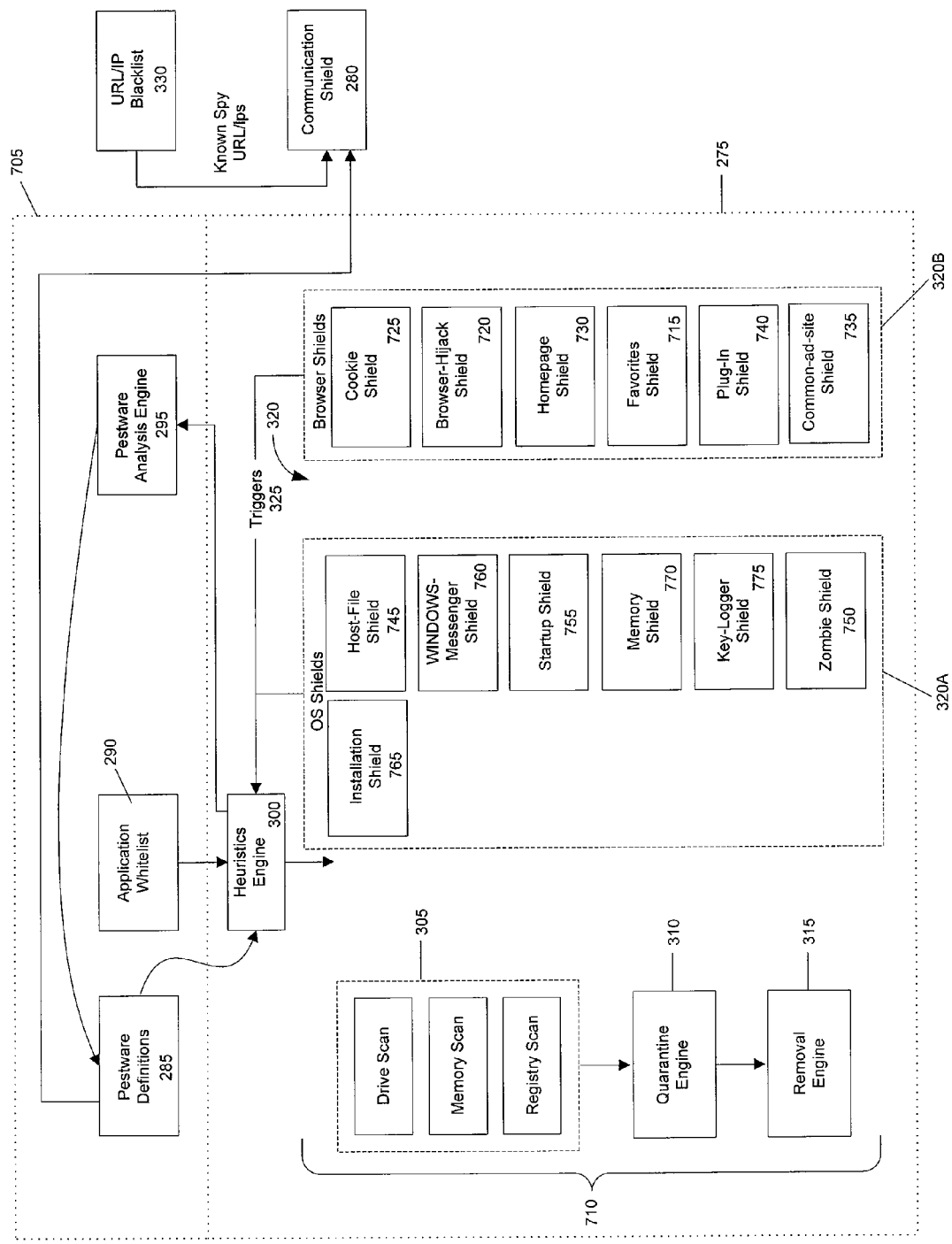
FIG. 7 is a block diagram of another embodiment of the present invention.

Referring now to FIG. 7, it illustrates another embodiment of the present invention. This figure illustrates the host system 705, the protected computer 275, and an enterprise-protection system 710. The enterprise-protection system 710 could also be used as an individual consumer product. And in these instances, the consumer could be operating a firewall or firewall-type application.

The host system 705 can be integrated onto a server-based system or arranged in some other known fashion. The host system 705 could include pestware definitions 285, which include both definitions and characteristics common to pestware. The host system 705 could also include a list of potentially acceptable pestware. This list is referred to as an application white list 290. Applications such as the GOGGLE toolbar and KAAZA could be included in this list. A copy of this list could also be placed on the protected computer 275 where it could be customized by the user. Additionally, the host system 705 could include a pestware analysis engine 295. This engine is configured to receive snapshots of all or portions of a protected computer 275 and identify the activities being performed by pestware. For example, the analysis engine 295 could receive a copy of the registry files for a protected computer that is running pestware. Typically, the analysis engine 295 receives its information from the heuristics engine 300 located on the protected computer 275.

The pestware-protection functions operating on the protected computer are represented by the sweep engine 305, the quarantine engine 310, the removal engine 315, the heuristic engine 300, and the shields 320. And in this implementation, the shields 320 are divided into the operating system shields 320A and the browser shields 320B. All of these engines can be implemented in a single software package or in multiple software packages.

The basic functions of the sweep, quarantine, and removal engines were discussed above. To repeat, however, these three engines compare files and registry entries on the protected computer against known pestware definitions and characteristics. When a match is found, the filed is quarantined and removed.

The shields 320 are designed to watch for pestware and for typical pestware activity and includes two types of shields: behavior-monitoring shields and definition-based shields. In some implementations, these shields can also be grouped as operating-system shields 320A and browser shields 320B.

The browser shields 320B monitor a protected computer for certain types of activities that generally correspond to pestware behavior. Once these activities are detected, the shield gives the user the option of terminating the activity or letting it go forward. The definition-based shields actually monitor for the installation or operation of known pestware. These shields compare running programs, starting programs, and programs being installed against definitions for known pestware. And if these shields identify known pestware, the pestware can be blocked or removed. Each of these shields is described below.

Favorites Shield—The favorites shield 715 monitors for any changes to a browser's list of favorite Web sites. If an attempt to change the list is detected, the shield presents the user with the option to approve or terminate the action.

Browser-Hijack Shield—The browser-hijack shield 720 monitors the WINDOWS registry file for changes to any default Web pages. For example, the browser-hijack shield 720 could watch for changes to the default search page stored in the registry file. If an attempt to change the default search page is detected, the shield presents the user with the option to approve or terminate the action.

Cookie Shield—The cookie shield 725 monitors for third-party cookies being placed on the protected computer. These third-party cookies are generally the type of cookie that relay information about Web-surfing habits to an ad site. The cookie shield 725 can automatically block third-party cookies or it can presents the user with the option to approve the cookie placement.

Homepage Shield—The homepage shield 730 monitors the identification of a user's homepage. If an attempt to change that homepage is detected, the shield 730 presents the user with the option to approve or terminate the action.

Common-ad-site Shield—Common-ad-site shield 735 monitors for links to common ad sites, such as doubleclick.com, that are embedded in other Web pages. The shield compares these embedded links against a list of known ad sites. And if a match is found, then the shield 735 replaces the link with a link to the local host or some other link. For example, this shield could modify the hosts files so that IP traffic that would normally go to the ad sites is redirected to the local machine. Generally, this replacement causes a broken link and the ad will not appear. But the main Web page, which was requested by the user, will appear normally.

Plug-in Shield—Plug-in shield 740 monitors for the installation of plug-ins. For example, the plug-in shield 740 looks for processes that attach to browsers and then communicate through the browser. Plug-in shields can monitor for the installation of any plug-in or can compare a plug-in to a pestware definition. For example, this shield could monitor for the installation of INTERNET EXPLORER Browser Help Objects.

Referring now to the operating system shields 320A, they include the zombie shield, the startup shield, and the WINDOWS-messenger shield. Each of these is described below.

Host-File Shield—The host-file shield 745 monitors the host file for changes to DNS addresses. For example, some pestware will alter the address in the host file for yahoo.com to point to an ad site. Thus, when a user types in yahoo.com, the user will be redirected to the ad site instead of yahoo's home page. If an attempt to change the host file is detected, the host-file shield 745 presents the user with the option to approve or terminate the action.

Zombie shield—The zombie shield 750 monitors for pestware activity that indicates a protected computer is being used unknowingly to send out spam or email attacks. The zombie shield 750 generally monitors for the sending of a threshold number of emails in a set period of time. For example, if ten emails are sent out in a minute, then the user could be notified and user approval required for further emails to go out. Similarly, if the user's address book is accessed a threshold number of times in a set period, then the user could be notified and any outgoing emails blocked until the user gives approval. And in another implementation, the zombie shield 750 can monitor for data communications when the system should otherwise be idle.

Startup shield—The startup shield 755 monitors the run folder in the WINDOWS registry for the addition of any program. It can also monitor similar folders, including Run Once, Run OnceEX, and Run Services in WINDOWS-based systems. And those of skill in the art can recognize that this shield can monitor similar folders in UNIX, LINUX, and other types of systems. Regardless of the operating system, if an attempt to add a program to any of these folders or a similar folder, the shield 755 presents the user with the option to approve or terminate the action.

WINDOWS-messenger shield—The WINDOWS-messenger shield 760 watches for any attempts to turn on WINDOWS messenger. If an attempt to turn it on is detected, the shield 760 presents the user with the option to approve or terminate the action.

Moving now to the definition-based shields, they include the installation shield, the memory shield, the communication shield, and the key-logger shield. And as previously mentioned, these shields compare programs against definitions of known pestware to determine whether the program should be blocked.

Installation shield—The installation shield 765 intercepts the CreateProcess operating system call that is used to start up any new process. This shield compares the process that is attempting to run against the definitions for known pestware. And if a match is found, then the user is asked whether the process should be allowed to run. If the user blocks the process, steps can then be initiated to quarantine and remove the files associated with the process.

Memory shield—The memory shield 770 is similar to the installation shield 765. The memory shield 770 scans through running processes matching each against the known definitions and notifies the user if there is a spy running. If a running process matches a definition, the user is notified and is given the option of performing a removal. This shield is particularly useful when pestware is running in memory before any of the shields are started.

Communication shield—The communication shield 280 scans for and blocks traffic to and from IP addresses associated with a known pestware site. The IP addresses for these sites can be stored on a URL/IP blacklist 330. And in an alternate embodiment, the communication shield can allow traffic to pass that originates from or is addressed to known good sites as indicated in a whitelist. This shield can also scan packets for embedded IP addresses and determine whether those addresses are included on a blacklist or whitelist.

The communication shield 280 can be installed directly on the protected computer, or it can be installed at a firewall, firewall appliance, switch, enterprise server, or router. In another implementation, the communication shield checks for certain types of communications being transmitted to an outside IP address. For example, the shield may monitor for information that has been tagged as private.

The communication shield could also inspect packets that are coming in from an outside source to determine if they contain any pestware traces. For example, this shield could collect packets as they are coming in and will compare them to known definitions before letting them through. The shield would then block any that are tracks associated with known pestware.

To manage the timely delivery of packages, embodiments of the communication shield can stage different communication checks. For example, the communication shield could initially compare any traffic against known pestware IP addresses or against known good IP addresses. Suspicious traffic could then be sent for further scanning and traffic from or to known pestware sites could be blocked. At the next level, the suspicious traffic could be scanned for communication types such as WINDOWS messenger or INTERNET EXPLORER. Depending upon a security level set by the user, certain types of traffic could be sent for further scanning, blocked, or allowed to pass. Traffic sent for further processing could then be scanned for content. For example, the traffic could be scanned to determine whether it is related to HTML pages, JAVASCRIPT programs, ACTIVEX objects, etc. Again, depending upon a security level set by the user, certain types of traffic could be sent for further scanning, blocked, or allowed to pass.

Key-logger shield—The key-logger shield 775 monitors for pestware that captures and reports out key strokes by comparing programs against definitions of known key-logger programs. The key-logger shield 775, in some implementations, can also monitor for applications that are logging keystrokes—independent of any pestware definitions. In these types of systems, the shield 775 stores a list of known good programs that can legitimately log keystrokes. And if any application not on this list is discovered logging keystrokes, it is targeted for shut down and removal. Similarly, any key-logging application that is discovered through the definition process is targeted for shut down and removal. The key-logger shield 775 could be incorporated into other shields and does not need to be a stand-alone shield.

Still referring to FIG. 7, the heuristics engine 300 blocks repeat activity and can also notify the host system 705 about reoccurring pestware. Generally, the heuristics engine 300 is tripped by one of the shields (shown as trigger 325). Stated differently, the shields report any suspicious activity to the heuristics engine 300. If the same activity is reported repeatedly, that activity can be automatically blocked or automatically permitted—depending upon the user's preference. The heuristics engine 300 can also present the user with the option to block or allow an activity. For example, the activity could be allowed once, always, or never.

And in some implementations, any blocked activity can be reported to the host system 705 and in particular to the pestware analysis engine 295. The pestware analysis engine 295 can use this information to form a new pestware definition or to mark characteristics of certain pestware.

In conclusion, the present invention provides, among other things, a system and method for managing pestware. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for blocking pestware activity, the method comprising:
   detecting an initial pestware activity on a protected computer;
   recording the initial pestware activity;
   receiving an instruction from a user of the protected computer to block the initial pestware activity;
   blocking the initial pestware activity;
   detecting a subsequent pestware activity;
   comparing the subsequent pestware activity with the initial pestware activity;
   responsive to the subsequent pestware activity matching the initial pestware activity, automatically blocking the subsequent pestware activity;
   identifying a process responsible for the subsequent pestware activity;
   identifying, on a storage device, a program file corresponding to the process;
   injecting termination code into the program file corresponding to the process, the termination code determining whether the process is permitted to restart from the program file subsequent to being terminated; and
   terminating the process;
   wherein the termination code is configured to:
      cause the process, upon attempting to launch itself from the program file subsequent to being terminated, to compare itself against a list of pestware that is targeted for removal from the protected computer;
      prevent the process from starting up when the process matches pestware in the list of pestware that is targeted for removal from the protected computer; and
      permit the process to start up normally when the process does not match any pestware in the list of pestware that is targeted for removal from the protected computer.

2. The method of claim 1, wherein the termination code is configured to remove itself from the program file automatically when the process does not match any pestware in the list of pestware that is targeted for removal from the protected computer.

3. The method of claim 1, wherein the list of pestware that is targeted for removal from the protected computer includes at least one of known pestware and pestware that is suspected of restarting itself.

4. The method of claim 1, wherein the termination code is configured to cause the process to compare a file name associated with the process against a list of file names associated with the pestware that is targeted for removal from the protected computer.

5. The method of claim 1, wherein the termination code is configured to cause the process to compare a digital signature of itself against a set of digital signatures associated with known pestware.

6. The method of claim 1, wherein the termination code is configured to cause the process to call another program that compares the process against the list of pestware that is targeted for removal from the protected computer.

7. A digital computer, comprising:
- at least one processor; and
- a memory containing a plurality of program instructions configured to cause the at least one processor to:
  - detect an initial pestware activity on the digital computer;
  - record the initial pestware activity;
  - receive an instruction from a user of the digital computer to block the initial pestware activity;
  - block the initial pestware activity;
  - detect a subsequent pestware activity;
  - compare the subsequent pestware activity with the initial pestware activity;
  - block automatically the subsequent pestware activity responsive to the subsequent pestware activity matching the initial pestware activity;
  - identify a process responsible for the subsequent pestware activity;
  - identify, on a storage device, a program file corresponding to the process;
  - inject termination code into the program file corresponding to the process, the termination code determining whether the process is permitted to restart from the program file subsequent to being terminated; and
  - terminate the process;
- wherein the termination code is configured to:
  - cause the process, upon attempting to launch itself from the program file subsequent to being terminated, to compare itself against a list of pestware that is targeted for removal from the digital computer;
  - prevent the process from starting up when the process matches pestware in the list of pestware that is targeted for removal from the digital computer; and
  - permit the process to start up normally when the process does not match any pestware in the list of pestware that is targeted for removal from the digital computer.

* * * * *